(No Model.)
J. M. W. LONG & J. B. FISCHER.
MANUFACTURE OF SHOVELS.
No. 350,067.        Patented Sept. 28, 1886.
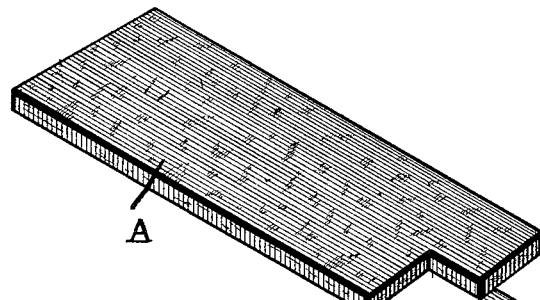
Fig. 1.
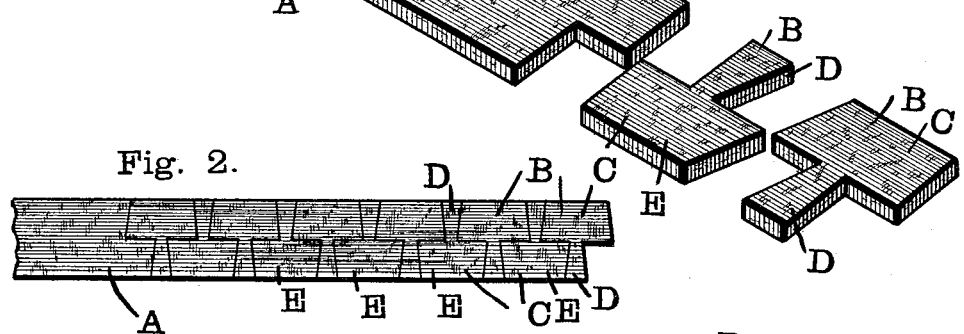
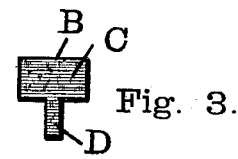
Fig. 3.
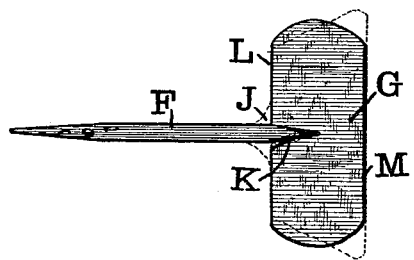
Fig. 4.
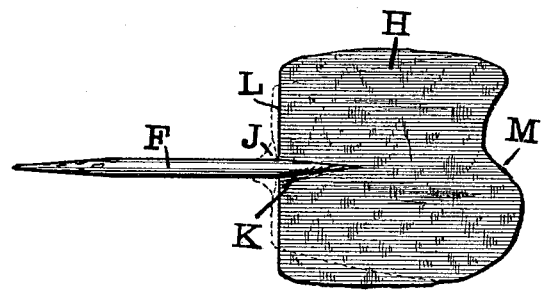
Fig. 5.
Witnesses:
J. W. Snyder
W. A. Seward
John M. W. Long
Joseph B. Fischer    Inventors
by James W. See    Attorney

UNITED STATES PATENT OFFICE.

JOHN M. W. LONG AND JOSEPH B. FISCHER, OF HAMILTON, OHIO.

MANUFACTURE OF SHOVELS.

SPECIFICATION forming part of Letters Patent No. 350,067, dated September 28, 1886.

Application filed March 29, 1886. Serial No. 196,890. (No model.)

*To all whom it may concern:*

Be it known that we, JOHN M. W. LONG and JOSEPH B. FISCHER, of Hamilton, Butler county, Ohio, have invented certain new and useful Improvements in the Manufacture of Hoes, of which the following is a specification.

This invention pertains to improvements in the art of manufacturing that class of agricultural hoes known as "shank-hoes." In shank-hoes the blade of the hoe has a solid shank projecting from it, the handle of the hoe being attached to the shank in some cases by the shank being inserted in the handle, and in other cases by a socket being welded or otherwise attached to the extremity of the shank.

The technology of the art of hoe-making is not by any means well established, and we think it proper before proceeding with detailed description of our improvements to note the definitions which we intend shall apply to certain terms liable to be frequently used in the detailed description.

In the execution of our improvements we cut certain-shaped pieces from flat plates or bars of metal. The pieces thus cut out we herein term the "planchets," and the act of cutting them out we herein term "plancheting." These planchets are then rolled or otherwise treated to increase their width without materially increasing their length, the shank at the same time being at least fairly formed. The planchets in this condition we herein term the "blooms," and the act of rolling or otherwise extending the planchets widthwise we herein term "blooming." The blooms are then rolled or otherwise treated to extend their bodies lengthwise without materially increasing their width. The blooms in this condition we herein term the "hoe-blanks," and the act of extending the blooms lengthwise we herein term "plating." When the hoe-blanks are trimmed to shape, the shanks bent, and the polishing done, the hoe is complete and ready for the handle.

Our improvements will be readily understood from the following description, taken in connection with the accompanying drawings, in which—

Figure 1 is a perspective view of the bar of metal from which the planchets are cut, two of the planchets being shown dissected; Fig. 2, a top view of a similar bar lined out to indicate the cuttings in the act of plancheting, this figure being upon a smaller scale than Fig. 1; Fig. 3, a plan or top view of one of the planchets, shown, however, as having a parallel shank; Fig. 4, a plan or top view of a bloom with the shank drawn out; and Fig. 5 a plan or top view of a hoe-blank. It should be understood that Fig. 3 represents a planchet, Fig. 4 a bloom, and Fig. 5 a hoe-blank.

In the drawings, A indicates a flat bar of metal having a thickness equal at least to the thickness of the shank of the completed hoe; B, planchets cut therefrom and having the form of a body provided with a shank; C, the body of a planchet, the same being of such dimensions as will, after blooming and plating, result in a hoe-blank of a size adapted to be trimmed to the desired size of hoe-blade; D, the shank of the planchet, the same projecting centrally from one edge of the body, and having a length equal to the length of the body of the planchet, the length of the body of the planchet being its shorter side dimension; E, in Figs. 1 and 2, alternate ones of the planchets as they are cut from the bar, beginning with the one next after the first one formed from the bar; F, the shank of the bloom or of the hoe-blank, the same being formed from the shank of the planchet by operations which lengthen and round up the shank; G, the body of the bloom, the same resulting from the thinning and widthwise extending of the body of the planchet; H, the body of the hoe-blank, the same resulting from the plating or lengthwise extending and thinning of the body of the bloom; J, fillets at the point where the shank joins the body of the bloom or hoe-blank; K, that portion of the shank falling within the boundary of the bloom or hoe-blank; L, the heel of the bloom or hoe-blank, and M the toe edge of the bloom or hoe-blank.

The planchets are cut from the bar in an ordinary punching-machine whose punch and die have the form of the planchet. The end of the bar is first presented to one of the sides of the punch, which cuts the end of the bar into the form indicated at the right-hand end of Fig. 2. This is a mere preparatory operation, and is performed only once with each new bar. The bar is then placed under the punch with the end of the bar projecting beyond the side of the punch a distance equal to the width of the body of the planchet. When the punch descends, it will punch out a planchet, and the end of the bar projecting sidewise beyond the punch will of course fall off, thus producing two planchets at each stroke of the punch, and this without any reversing of the bar. Thus it will be seen that the alternate planchets are punched out of the bar, while the intermediate planchets are freed by the punching act. The planchets may of course be cut from wide plates of metal; but it is far preferable to slit the wide plate into bars. In either case there is no waste of stock, except at the fag ends of the bars and at the initial end where the preliminary cut referred to is made. The planchets are then heated and the shanks are drawn in the usual manner, generally under drops or hammers or between dies. The planchets are then ready for blooming, which act consists in drawing the bodies out sidewise, considerably thinning the metal, except at the shank. This blooming may be done by hammer-drawing; but it is preferably done by passing the planchet, while hot, sidewise through rolls fitted with recesses to permit the transverse passage of the shank without being thinned. The bloom then appears as in Fig. 4, the body having a width equal to the width of the blade of the complete hoe, but having much greater thickness and much less length than such a blade. The bloom is then, while hot, plated out into a hoe-blank, as shown in Fig. 5, by process of hammering, or, preferably, rolling. This operation completes the thinning of the body metal and extends the body lengthwise, and produces a hoe-blank ready for trimming, &c.

In Fig. 3 the planchet is shown as having the side edges of its body parallel, as are also the side edges of the shank, while in Figs. 1 and 2 the planchets have the side edges of the body narrowing toward the toe, while the side edges of the shank narrow toward the body. If the planchet be of the parallel form indicated in Fig. 3, it will produce a bloom whose outline is indicated by the dotted lines in Fig. 4—that is, the body of the bloom will be very much narrower at its heel than at its toe. This is due to the fact that at the toe all of the metal has been employed in the sidewise extension, while at the heel a certain portion of the metal has been retained in the shank. The fillet J will also be heavy and rather extensive. The bloom thus made from a planchet having parallel body and shank will plate into a hoe-blank having a form indicated in a general way by the dotted lines in Fig. 5, where again we find a narrow heel to the body and a heavy fillet. A hoe-blank of the form indicated by the dotted lines cannot be trimmed to form so large a hoe as would be the case were the hoe-blank of the form indicated by the full lines, and the presence of the fillets will cause much trouble in trimming, as these parts have to be trimmed by the sharp corners of trimming-punches. By narrowing the shank of the planchet where it joins the body much of this filleting in the bloom and hoe-blank is avoided. By widening the body of the planchet at its heel we compensate for the metal left in the shank at K, and thus avoid the heelward narrowing of the bloom and hoe-blank, and are able to produce blooms and hoe-blanks of the form indicated by main outlines in Figs. 4 and 5, respectively, thus enabling us to get the greatest width of hoe-blade out of the given amount of metal in the planchets.

We claim as our invention—

1. The improved planchet for use in the manufacture of hoes, formed with a body and a shank of equal thickness, the shank projecting centrally from the heel of the body and having a length equal to the length of the body, substantially as and for the purpose set forth.

2. A hoe-blank formed from a shanked sheet-metal planchet, whose body is broadened at the heel and whose shank is narrowed at the juncture with the body, substantially as and for the purpose set forth.

3. The method herein described of cutting blanks from metal plate to the form or shape shown—that is to say, blanks having angular outlines, the blade slightly broader at the heel than at the point, the tang slightly broader at the extremity than at the heel, by adopting lines of cut to be followed by the cutters, which shall lead to the production in contiguous blanks, and by the process of division of accurately defined edges of such particularly-shaped blanks, and all of this substantially without waste of material.

JOHN M. W. LONG.
JOSEPH B. FISCHER.

Witnesses:
WALTER S. BACE,
W. A. SEWARD.